(12) United States Patent
Gary

(10) Patent No.: US 6,209,821 B1
(45) Date of Patent: Apr. 3, 2001

(54) APPARATUS AND METHOD FOR MEASURING AIR TEMPERATURE AHEAD OF AN AIRCRAFT FOR CONTROLLING A VARIABLE INLET/ENGINE ASSEMBLY

(75) Inventor: Bruce L. Gary, Santa Barbara, CA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 09/408,648

(22) Filed: Sep. 14, 1999

(51) Int. Cl.⁷ .................................................. B64D 33/02
(52) U.S. Cl. ..................... 244/53 B; 60/200.1; 60/39.29; 137/15.2
(58) Field of Search ............................... 244/73 R, 53 B; 137/15.1, 15.2; 60/39.29, 39.03

(56) References Cited

U.S. PATENT DOCUMENTS

| | | | |
|---|---|---|---|
| 2,589,971 | 3/1952 | Skarstom | 73/119 |
| 2,971,328 | 2/1961 | McLafferty | 60/35 |
| 3,032,976 | 5/1962 | Theodorsen | 60/35 |
| 3,181,818 | 5/1965 | Pearl | 244/53 |
| 3,302,657 | 2/1967 | Bullock | 137/15 |
| 3,335,978 | 8/1967 | Sherman | 244/231 |
| 4,346,595 | 8/1982 | Gary | 244/231 |
| 4,474,062 | 10/1984 | Gary | 73/178 |
| 5,117,689 | 6/1992 | Gary | 73/178 |
| 5,161,890 | * 11/1992 | Fima | 374/123 |
| 6,070,460 | * 6/2000 | Leslie et al. | 73/170.07 |

FOREIGN PATENT DOCUMENTS 1202647    7/1965    (DE).

* cited by examiner

Primary Examiner—Charles T. Jordan
Assistant Examiner—George L. Steele
(74) Attorney, Agent, or Firm—John H. Kusmiss

(57) ABSTRACT

The apparatus and method employ remote sensing to measure the air temperature a sufficient distance ahead of the aircraft to allow time for a variable inlet/engine assembly to be reconfigured in response to the measured temperature, to avoid inlet unstart and/or engine compressor stall. In one embodiment, the apparatus of the invention has a remote sensor for measuring at least one air temperature ahead of the vehicle and an inlet control system for varying the inlet. The remote sensor determines a change in temperature value using the at least one temperature measurement and prior temperature measurements corresponding to the location of the aircraft. The control system uses the change in air temperature value to vary the inlet configuration to maintain the position of the shock wave during the arrival of the measured air in the inlet. In one embodiment, the method of the invention includes measuring at least one air temperature ahead of the vehicle, determining an air temperature at the vehicle from prior air temperature measurements, determining a change in temperature value using the air temperature at the vehicle and the at least one air temperature measurement ahead of the vehicle, and using the change in temperature value to reposition the airflow inlet, to cause the shock wave to maintain substantially the same position within the inlet as the airflow temperature changes within the inlet.

35 Claims, 5 Drawing Sheets

APPARATUS AND METHOD FOR MEASURING AIR TEMPERATURE AHEAD OF AN AIRCRAFT FOR CONTROLLING A VARIABLE INLET/ENGINE ASSEMBLY

ORIGIN OF THE INVENTION

The invention described herein was made in the performance of work under a NASA contract, and is subject to the provisions of Public Law 96-517 (35 USC 202) in which the contractor has elected not to retain title.

BACKGROUND OF THE INVENTION

As the demand for travel to distant destinations has increased, the need for faster and more efficient supersonic aircraft has grown. This need is no longer limited to military applications, as demand for improved civilian supersonic transports has greatly increased. Although past generation supersonic aircraft have been operating for decades, they have always been limited in their efficiency. The efficiency of supersonic aircraft affects their range and operating costs. One approach to increasing efficiency has been to improve the engine operation. This has been achieved in part by using air inlets which are designed to be adjusted in flight to control the airflow and optimize engine performance. Although this approach has resulted in increased operating efficiency, it has come at the cost of increased occurrences of inlet "unstarts" and engine compressor stalls, which risk passenger safety and reduce efficiency and engine output.

When the shock wave is maintained at the throat of the inlet, the inlet is defined as being "started". When the shock is not positioned at the throat, the inlet is "unstarted". During an unstart condition there is a greater loss of pressure over the shock wave, which dramatically lowers the efficiency of the inlet. An unstart may cause excess air to spill out from the front of the inlet and produce significant drag. Further, the change in airflow and pressures can cause the engine's compressor to stall, which greatly reduces the engine's power output. Those aboard a supersonic aircraft which experiences an unstart, experience a sudden jolt as the aircraft lurches backwards when the engine thrust abruptly drops. While such a jolt may be acceptable in military applications, it is definitely unacceptable for civilian transports.

To try to solve this unstart problem, various devices have been developed which attempt to limit the occurrence of unstarts. One approach has been to maintain the location of the shock wave by using a series of sensors placed longitudinally along the inlet to measure pressures within the inlet. These pressure measurements are then compared to a fixed set of pressures, which are indicative of proper placement of the shock wave in the inlet throat. In the event the shock wave is improperly positioned a control system takes corrective action by moving a bypass baffle to a more open or closed position, to move the shock wave forward or aft in the inlet.

Since these prior devices sampled the airflow at the inlet, and since they required time to react to changes in the airflow, a built-in lag unfortunately exists. This lag allows relatively sudden changes in the airflow to cause unstarts. Increasing the response speed of the control system has been attempted to reduce unstarts. However as the response speed is increased the control system becomes subject to unacceptable stability problems. Attempts have also been made to use trends of airflow conditions to predict changes to the conditions, so that the control system begins to "react" before the need for it is certain. However, these predictions have not been sufficiently reliable to adequately anticipate future temperature changes. Another approach to the lag problem has been to add an attitude anticipator system to the control system. The attitude anticipator measures the rate of change of attitude and adjusts the inlet geometry and bypass baffle positioning to avoid unstarts. However, this system was limited to changes in attitude of the aircraft, and as such could not anticipate changes in the airflow itself.

Therefore, a need exists for a device which is able to accurately anticipate changes in airflow conditions so as to avoid unstarts in supersonic aircraft engines. The device must be able to sense changes in the airflow conditions prior to arrival of the changes at the inlet, to allow the control system to reposition the bypass baffle in a timely manner.

SUMMARY OF THE INVENTION

The present invention employs remote sensing instrument to measure the temperature of the air at a sufficient distance ahead of an aircraft, to allow time for an inlet/engine assembly to be adjusted by a control system to conform to changes in the engine inlet temperature. For supersonic capable aircraft which have a variable engine inlet designed to retain a shock wave within the inlet, the invention takes an air temperature measurement a distance ahead of the aircraft, to provide enough time so the engine inlet can be repositioned to avoid inlet unstart and/or engine compressor stall. In so doing, the invention provides the inlet control system sufficient time to make the necessary inlet changes, without having to force the control system to become unstable by overly increasing its response speed. Also, by providing a measurement of the actual temperature ahead of the aircraft, the invention avoids the need to use unreliable temperature trend analyses or predictions based upon the airflow conditions measured at the aircraft or upon the aircraft's attitude.

The apparatus of the invention is embodied in an air vehicle having a variable airflow inlet and/or engine. The apparatus includes a remote sensor, for measuring the air temperature ahead of the aircraft, and an inlet control system for varying the inlet and/or engine to conform to the measured air temperature. The air temperature measurement is made by the remote sensor a sufficient distance ahead of the aircraft to allow time for the inlet and/or engine to be adjusted at or near the arrival of the measured air in the inlet and/or engine.

During supersonic flight, the inlet can retain a shock wave within it. In such a flight condition, the remote sensor measures the air temperature ahead of the vehicle and provides the measurement to the inlet control system. In turn, the inlet control system varies the inlet to control positioning of the shock wave within the inlet. The remote sensor can be a radiometer, such as a passive microwave radiometer. The control system is connected to the inlet and to the remote sensor to receive the measurement of the air temperature ahead of the vehicle. As such, the inlet control system can vary the inlet to maintain the position of the shock wave during the arrival of the air having a measured temperature entering the inlet and thus prevent the unstart condition.

In one embodiment, the apparatus includes a microwave radiometer and an inlet control system. The microwave radiometer determines a change in air temperature value (AT) and transmits it to the inlet control system. The inlet control system uses the change in temperature value to vary the inlet (e.g. a bypass baffle) so that the position of the shock wave in the inlet is maintained, or otherwise kept within an acceptable range, during the arrival of air in the inlet which corresponds to the measured temperature change. The radiometer is mounted to the vehicle and orientated to allow measurements to be taken along the flight path of the vehicle. The radiometer includes a sensor unit and a data unit. The sensor and data units measure air temperature at at least one "applicable range" ahead of the vehicle. The data unit determines the change in temperature value by comparing present and past temperature measurements made by the sensor unit. In its simplest form, the change in temperature value is determined by the data unit finding the difference between a current temperature measured at the applicable range and a past temperature measurement of air which currently corresponds to the location of the vehicle. However, the data unit can provide a more precise form of determining the change in temperature value by using the current temperature measurement and a series of past temperature measurements. The data unit is in communication with the sensor unit. The data unit is also in communication with the inlet control system so as to provide the control system with the change in temperature values. In turn, the inlet control system is in communication with inlet pressure transmitters and uses the pressure measurements obtained therefrom to determine the location of the shock wave within the inlet. The inlet control system is also in communication with the bypass baffle of the inlet. The bypass baffle controls the airflow into the engine by diverting air from the inlet. The inlet control system operates to vary the bypass baffle position to regulate the location of the shock wave within the inlet. Further, the inlet control system uses the change in temperature value provided by the radiometer to vary the position of the bypass baffle, to compensate for the shock wave movement that would occur in the absence of a bypass baffle position change. This acts to maintain an acceptable position of the shock wave during the arrival of the air having a measured temperature entering the inlet.

The method of the invention is embodied in an air vehicle having a variable inlet/engine assembly. The method includes measuring at least one air temperature ahead of the vehicle, and varying the inlet/engine assembly in response to the at least one air temperature measurement. Specifically, the step of varying the inlet/engine assembly includes determining a change in temperature value (ΔT) using the at least one air temperature measurement, and using this change in air temperature value to vary the inlet/engine assembly in a timely manner to accommodate the change in air temperature in the inlet.

In one embodiment, the method is used in a supersonic capable vehicle having a variable airflow engine inlet with a shock wave positioned within the inlet. The method includes measuring an air temperature at at least one applicable range ahead of the vehicle, retaining prior air temperature measurements and their applicable range locations, determining an air temperature measurement corresponding to the position of the vehicle, determining an air temperature measurement corresponding to the expected position of the vehicle at a predetermined period of time in the future, determining a change in temperature value using the identified air temperature measurements, changing the position of the variable airflow engine inlet using the change in temperature value, so that the change in the variable airflow inlet position will cause the shock wave to be maintained within an acceptable location within the inlet. In turn, the step of changing the position of the variable airflow inlet includes calculating a desired position for the shock wave to compensate for a pending change in temperature in the inlet using the change in temperature value, measuring the location of the shock wave in the inlet, determining the difference between the desired position of the shock wave and the measured location of the shock wave, determining a desired position of the variable airflow inlet which will keep the shock wave within an acceptable location within the inlet as the airflow temperature changes within the inlet, and reconfiguring the variable airflow inlet to the desired position.

DETAILED DESCRIPTION OF THE PREFERRED EMBODIMENTS

In the preferred embodiment, the apparatus of the invention is mounted in an aircraft with a variable inlet/engine assembly and operates to vary the inlet/engine assembly in response to measured air temperature changes. The inlet/engine assembly can be varied to prevent onset of an inlet unstart and/or engine compressor stall. The invention includes a remote temperature sensor and a control system connected to the inlet/engine assembly. The remote temperature sensor measures the air temperature far enough ahead of the aircraft to allow sufficient time for the control system to react before arrival of any temperature change. That is, the inlet/engine assembly is commanded to change to a proper configuration at a time such that the adjustment is completed to coincide with the entrance into inlet of the air having a different temperature. For aircraft flying at supersonic speed, the timing of the adjustment results in maintaining the position of the shock wave within an acceptable location in the inlet. This keeps the inlet started throughout changes in air temperature. Thus, a significant advantage is obtained over the prior inlet control systems, which relied upon measurements of the airflow taken at the aircraft and as such could not react fast enough to avoid unstarts.

Remote Temperature Sensor Components

Figure 1:
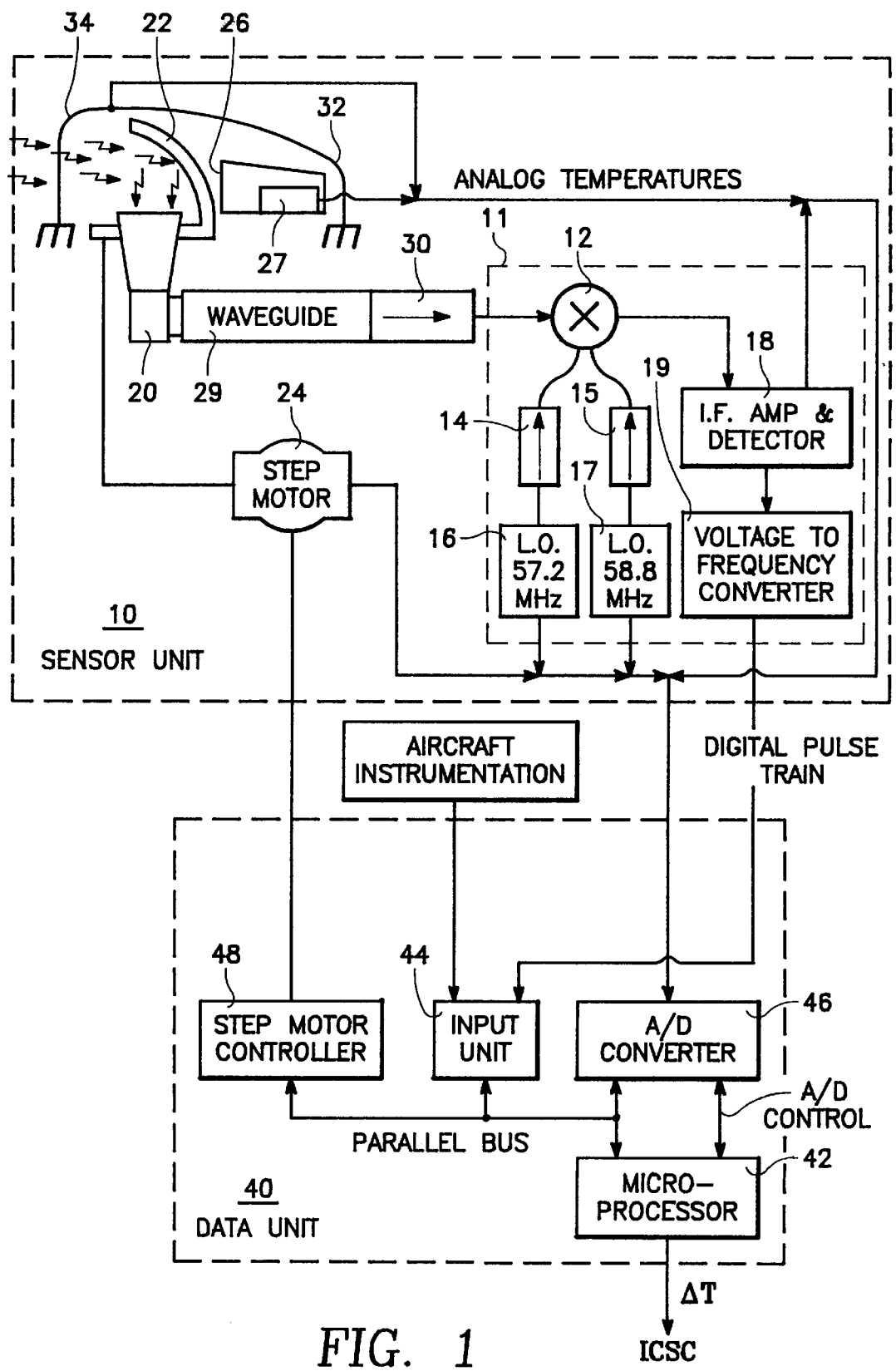
FIG. 1 is a schematic of components of the remote sensor and data unit.

Although various types of remote temperature sensing devices could be used in the present invention, in the preferred embodiments a passive microwave radiometer is used to measure the temperature of the air ahead of the aircraft. The radiometer measures thermal emission from oxygen molecules located ahead of the aircraft. The radiometer has two primary components: a sensor unit 10 and a data unit 40, as shown in FIG. 1. This type of radiometer is described in U.S. Pat. No. 5,117,689, U.S. Pat. No. 4,346,595 and in a paper by Richard F. Denning, Steven L. Guidero, Gary S. Parks and Bruce L. Gary, "Instrument Description of the Airborne Microwave Temperature Profiler", J. Geophys. Res., 94, D14, 16,757–16,765, Nov. 30, 1989. The disclosure set forth in these patents and paper are hereby incorporated by reference.

The sensor unit 10 has the following components: a superheterodyne radiometer 11, a horn antenna 20, a reflector 22, a step motor 24, a calibration target 26, a waveguide 29 and an isolator 30.

The horn antenna 20 is a corrugated scalar feed horn. The horn antenna 20 receives microwaves reflected off the reflector 22. The reflector 22 is positioned in a fairing 32 attached to the aircraft outer surface. Reflector 22 receives microwaves through a window 34 set in the fairing 32. The window 34 is transparent to microwaves and is positioned in the fairing 32, to allow the reflector 22 to receive microwaves from in front of the aircraft. The reflector 22 can be rotated so that it may continue to be aimed towards the horizon as the pitch of the aircraft changes. The reflector 22 is moved by the step motor 24, which is controlled by the data unit 40. The reflector 22 can either be flat or have a parabolic shape to provide a smaller angular reception pattern.

Thus, microwaves which are generated by oxygen molecules in front of the aircraft are transmitted through the window 34, reflect off the reflector 22, and are received by the horn antenna 20. The power entering the horn antenna 20 is linearly proportional to the brightness temperature (TB) in the viewing direction. The conversion of radio frequency power level to brightness temperature is achieved using the microprocessor 42 of the data unit 40. During this conversion the microprocessor 42 calculates system gain from previously determined "gain versus instrument temperature" calibrations. System gain is the dependence of brightness temperature on the output level of the radiometer.

The conversion of radiometer output level to brightness temperature can be completed by determining a calibration offset by periodically turning the reflector 22 towards the calibration target 26. Calibration target 26 is set in the fairing 32 opposite the window 34, so that observation of the air forward of the aircraft is separate from observation of the calibration target 26. The target 26 has a high microwave emissivity, which assures that its brightness temperature can be equated with its physical temperature. A thermistor temperature sensor 27 is mounted in the target 26. Target 26 is allowed to stay at the ambient temperature, reducing the difference between the temperature of target 26 and the air ahead of the aircraft, which reduces the influence of any gain inaccuracies.

The microwaves received by the horn antenna 20 are transmitted through the waveguide 29, and then through isolator 30 before entering the superheterodyne radiometer 11. The waveguide 29 provides a path for microwaves to travel to the superheterodyne radiometer 11 from the horn antenna/reflector assembly. The isolator 30 reduces the level of unwanted local oscillator reflections from waveguide joints and other components on the antenna side of the isolator 30.

As shown in FIG. 1, the superheterodyne radiometer 11 includes: a mixer 12, isolators 14 and 15, local oscillators 16 and 17, an intermediate frequency (IF) amplifier and detector 18, and a voltage-to-frequency converter 19. The superheterodyne radiometer is a commercially available device, manufactured by Spacek Labs, Inc. of Santa Barbara, Calif. The radiometer 11 has two channels, which can have a 4.2 dB double-sideband noise figure. The radiometer 11 has a single mixer 12 for mixing the microwave input from the horn antenna with each of the two local oscillators 16 and 17. Local oscillator 16 operates at 57.2 GHz and local oscillator 17 operates at 58.8 GHz, corresponding to a wavelength of about 6 mm. The oscillators 16 and 17 are coupled to the mixer 12 by isolators 14 and 15. At the output of the mixer 12 is the IF amplifier and detector 18, which is attached to the voltage-to-frequency converter 19. The voltage-to-frequency converter 19 is attached to the data unit 40.

As shown in FIG. 1, the data unit 40 includes: the microprocessor 42, an input unit 44, an analog-to-digital converter 46 and the step motor controller 48. The components of the data unit 40 are in communication with one another. The microprocessor 42 provides the function of controlling the sensor unit 10 and recording data. The microprocessor 42 is programmed to carry out all the data processing and analysis and sends a change in temperature (ΔT) signal to the aircraft's inlet control system 70 to cause the bypass baffle 60 to be adjusted. The step motor 24 is connected to the step motor controller 48, which is in turn connected to the microprocessor 42.

In alternative embodiments of the present invention other types of remote temperature sensing devices can be used in place of the passive microwave radiometer. For example, an infrared radiometer can be used to provide measurements of the air temperature. However, an infrared radiometer is greatly affected by the presence of a layer of very hot air (on the order of 500K), existing over the front surface of the aircraft, produced by the aircraft's shock front. Since an infrared radiometer's passband will be subject to some atmospheric absorption and since at infrared wavelengths the emission of photons varies non-linearly with temperature in such a way that small increments of temperature increase will produce large increments of infrared radiometer output, there will be produced large unwanted components of shock front contamination. A correction for this hot air layer on the order of 7K is necessary.

In contrast, a microwave radiometer, which has a proportional relationship between emission region temperature and radiometer output, there exists a very small shock front contamination. This contamination would be on the order of approximately 0.03K.

In another alternative embodiment of the present invention, a single-sideband radiometer can be used in place of the double-sideband described above. However, a single sideband receiver is likely to be less sensitive to changes in atmospheric emission caused by changes in air temperature ahead of the aircraft.

Operation of the Radiometer

The radiometer 11 operates at 1 or 2 local oscillator (LO) frequencies. Each local oscillator frequency has upper and lower sidebands having intermediate frequencies (IF) between 280 and 380 MHz. It is preferred that the local oscillator frequencies employed be 58.8 and 57.2 GHz, which assure that the entirety of the upper and lower intermediate frequencies sidebands map to radio frequencies that are within the range where oxygen molecules emit thermal radiation strongly.

The radiometer 11 measures brightness temperature which is the weighted average of physical air temperature along the line of sight. The process of determining brightness temperature is a process well known in the art. The applicable equation for determining brightness temperature (TB) is:

$$TB \equiv \frac{\int_0^\infty W(r)T(r)dr}{\int_0^\infty W(r)dr}$$

Wherein the W(r) is the weighting function and T(r) is the source function. The weighting function is proportional to the probability that a microwave at a distance r will be transmitted (i.e. not absorbed) as it travels towards the radiometer positioned at r=0. As such, W(r) decreases quasi-exponentially with range, with a 1/e (0.368) distance equal to the reciprocal of the absorption coefficient of the atmosphere in the region r=0. The source function T(r) sets forth the air temperature as a function of range. Thus, the brightness temperature (TB) is a weighted average of the source function.

When the source function varies linearly with range, the weighted average equals the value of the source function at the range where the weighting function has the value 1/e (0.368). This location is called the applicable range. The radiometer 11 has an applicable range for each of its two operating frequencies (channels). Assuming a flight altitude of 19 km (62,336 ft.), and an intermediate frequency bandpass that extends from 280 MHz to 380 MHz, the applicable ranges of the radiometer 11 are 1.4 km and 2.4 km.

The radiometer 11 takes its temperature measurements in front of the aircraft and at the same altitude. This is accomplished by rotating the reflector 22 so as to keep it aimed toward the horizon, even as the pitch of the aircraft changes. The reflector 22 is rotated by the step motor 24, which is controlled by the step motor controller 48. The step motor controller 48 is in turn controlled by the microprocessor 42, which uses the aircraft instrumentation input to determine the pitch of the aircraft, and which provides a setting for the reflector 22 to compensate for the pitch.

At a predetermined interval (e.g. once every 5 minutes), the microprocessor 42 commands the reflector 22 to rotate so as to be aimed at the calibration target 26. This allows a system temperature offset calibration to be made when the reflector 22 is turned towards the calibration target 26. Also, the temperature of the mixer 12 is measured and provided to the data unit 40 for calculation of the system gain from gain equations provided by the manufacturer.

The microwaves reflected off the reflector 22 are collected by the horn antenna 20, then pass through the waveguide 29 and into the radiometer 11.

Within the radiometer 11, the local oscillator 16 which emits an oscillating voltage having a frequency of 57.2 GHz, is turned on long enough for the radiometer to provide a measurement of brightness temperature of the atmosphere ahead of the aircraft. This brightness temperature corresponds to air temperature at the weighting function's applicable range, specified by the radio frequencies accepted by the radiometer when the 57.2 GHz local oscillator is turned on. The microprocessor 42 in the data unit 40 then turns on the other local oscillator 17, which emits an oscillating voltage having a frequency of 58.8 GHz, for a time sufficient to measure the atmospheric brightness temperature at the other applicable range.

The mixer 12 mixes the microwave radiation received into the radiometer 11 with the alternatively selected local oscillator operated at 58.8 GHz and 57.2 GHz. At the output of the mixer 12, the IF amplifier and detector 18 produces a voltage signal proportional to IF amplitude (i.e. atmospheric brightness temperature). The voltage-to-frequency converter 19 converts the voltage signal to a train of pulses, which is sent to the data unit 40.

The input unit 44 receives the train of pulses from the voltage-to frequency converter 19, as well as other signals from the aircraft instrumentation (e.g. pressure altitude, pitch, roll). The input unit 44 converts these values to a digital form and has a memory which allows it to store the values for use by the microprocessor 42. The radiometer output generated when each of the two local oscillators 16 and 17 are turned on is transmitted to the data unit 40 as a digital pulse train that is counted for a pre-set interval (e.g. a quarter of a second), by a counter in the input unit 44. The analog-to-digital converter 46 converts the instrument temperature analog signals to digital form and has a memory which allows it to store the signals for use by the microprocessor 42.

The microprocessor 42 uses the current and previous brightness temperature measurements taken by the radiometer 11 to calculate the amount of change of inlet air temperature expected during the time interval between the anticipated instant that a bypass baffle setting change will be commanded and the instant the bypass baffle setting change will be completed. This time interval is referred to as $\Delta t$ and the radiometer-based change in temperature during $\Delta t$ is referred to as $\Delta T$. The microprocessor 42 calculates $\Delta T$ and provides the inlet control system 70 with this $\Delta T$ value. The microprocessor 42 can perform this task in many alternative ways. The simplest algorithm to be implemented by a program in the microprocessor 42 will take a temperature measurement from one of the applicable ranges and compare it with the temperature calculated for the other applicable range, and thereby derive a horizontal temperature gradient in the direction of flight, and with the aircraft speed and baffle setting response time, the horizontal temperature gradient is converted to $\Delta T$. The $\Delta T$ value can be obtained by the following formula:

$$\Delta T = \Delta t * V * (TB2 - TB1)/(R2 - R1)$$

Where TB1 and R1 are from channel 1 and TB2 and R2 are from channel 2 of the radiometer, R1 and R2 are the applicable ranges, and V is the aircraft velocity.

The trend analysis for determining $\Delta T$ can be derived using the Backus-Gilbert retrieval procedure or a statistical retrieval procedure. The application of these procedures are well known in the art. One statistical retrieval procedure which can be used to develop a trend analysis is "multiple regression" analysis. With multiple regression an archive of real or simulated measurements of observed parameter values are analyzed to develop retrieval coefficients for later use in multiplying observed quantities to derive the desired description of likely inlet air temperature versus future time, from which the parameter $\Delta T$ can be calculated. The retrieval coefficients that are derived from a multiple regression analysis allow for the conversion of a set of current brightness temperatures to near-future (predicted) air temperature values. Any parameter can be used in this analysis including past temperature measurements and past temperature trend measurements. To provide increased accuracy, the multiple regression analysis will assign larger coefficients to the parameters that are more relevant to the analysis than other parameters.

However, in the preferred embodiment, the $\Delta T$ value is based on a statistical retrieval procedure for recovering air temperature versus range. A temperature profile versus distance ahead of the aircraft has the advantage of providing a more accurate prediction of inlet air temperature versus time. Further, the statistical retrieval analysis provides the advantage of reducing effects of stochastic noise. A statistical retrieval coefficient calculation is made of the air temperature versus range for the region from the aircraft to a point sufficiently forward of the aircraft, to allow enough time to react to the temperature change. It is preferred that the brightness temperatures be taken every ⅓ of a second and region of the statistical retrieval be from 0 to 1.7 km (about 2 seconds of flight time). Thus, the microprocessor 42 will calculate (every ⅓ of a second) a predicted time history of the inlet air temperature for a set period of time in the future (preferably 2 seconds). Then, from this predicted time history, the microprocessor 42 will determine a ΔT value which will represent a most likely change in temperature during the interval Δt. This ΔT value is used by the inlet control system 70. It is preferred that the ΔT value be for one second before the airflow reaches the inlet.

The microprocessor 42 will perform the retrieval of ΔT using the desired algorithm. The microprocessor 42 is in communication with the inlet control system 70. The microprocessor 42 transmits the ΔT value to the control system 70 to allow it to adjust the inlet 60 to maintain the position of the shock wave at the inlet throat 66.

Inlet and Engine Components and Operation

Figure 2:
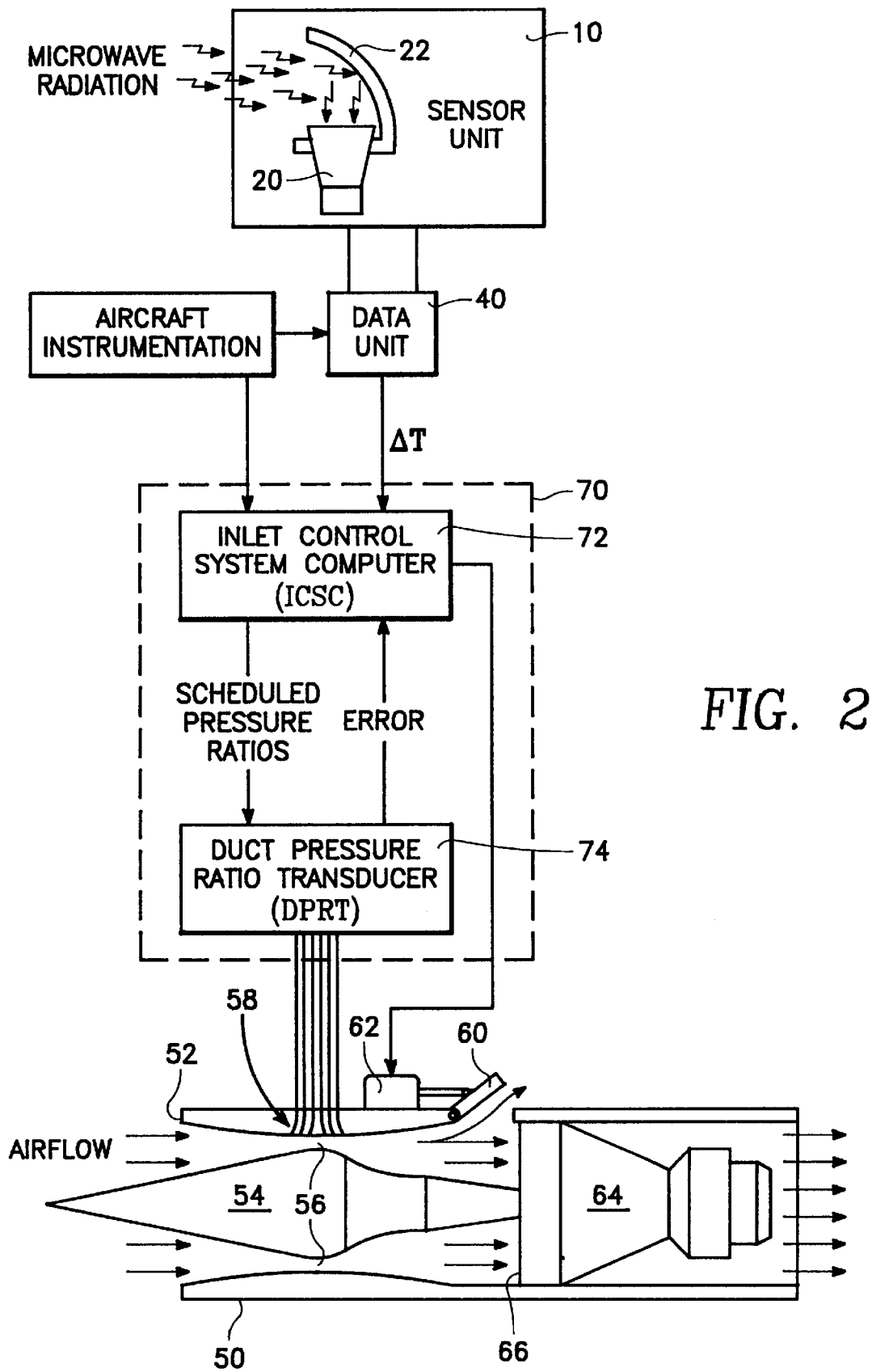
FIG. 2 is a schematic showing components including the sensor unit, the data unit, the inlet control system, the inlet and the engine.

As shown in FIG. 2, the inlet 50 has an inlet lip 52, an inlet spike 54, an inlet throat 56, pressure taps 58, bypass baffle 60 and baffle motor 62. The engine 64 has a compressor 66.

When the aircraft is flying at supersonic speeds, the inlet 50 decelerates the airflow to subsonic levels and provides acceptable pressure levels to allow the engine 64 to operate. Specifically, the inlet 50 is a converging-diverging shaped inlet, which functions to reduce the speed of the supersonic flow received at the inlet lip 52 down to a lower supersonic speed when it reaches the inlet throat 56. The inlet 50 is started when a shock wave, reducing the supersonic flow to subsonic speeds, exists across and at or about the inlet throat 56, as shown in FIG. 2. The inlet is unstarted when the shock wave is positioned outside of the inlet throat 56, such as at the inlet lip 52. The inlet 50 operates with the greatest efficiency when the inlet 50 is configured so the supersonic airflow slows to or just above Mach 1.0, before it enters the shock wave positioned at the inlet throat 56. This provides the greatest inlet efficiency, as the pressure loss across the shock wave during the conversion of the airflow's kinetic energy to potential energy is minimized.

To accommodate varying supersonic flight speeds, the inlet 50 has the inlet spike 54 which can be moved forward or aft, to vary the geometry of inlet 50. By moving the inlet spike 54, the cross-sectional area of the inlet throat 56 is changed. In addition to converting the airflow to subsonic speeds, the inlet 50 also can be configured to match the airflow requirements of engine 64. This is done by designing the inlet 50 to provide more airflow than is needed by the engine 64 and using the bypass baffle 60 to divert the excess airflow. As can be seen in FIG. 2, the bypass baffle 60 is positioned between the inlet and the engine compressor 66. The bypass baffle 60 is opened and closed by the baffle motor 62, which is attached thereto. The inlet control system 70 is used to adjust the baffle 60 during flight, so as to continuously provide the engine 64 with an airflow matching the engine's requirements. This increases performance and efficiency. Thus, by changing the position of the baffle 60, the air pressure behind the inlet throat 56 can be varied. Changing the air pressure behind the inlet throat 56 will cause the shock wave to move forward or aft in the inlet.

For example, if the baffle 60 is moved to a more closed position, the pressure between the throat and the engine compressor 66 will increase (assuming the engine 64 intake remains the same) and the shock wave will be forced forward in the inlet 50. If the baffle 60 is closed far enough, the shock wave will travel out of the throat 56 and the inlet 50 will become unstarted. Inlet unstarts can cause the compressor 66 to stall and result in dramatically reduced engine performance.

To measure the position of the shock wave, the inlet includes a set of pressure taps 58. As shown in FIG. 2, these taps are arranged along the length of the inlet at and about the inlet throat 56. The pressure taps 58 are in communication with the inlet control system 70, such that the inlet control system 70 can measure the pressure at each tap. The location of the shock wave can be determined by finding the abrupt increase in pressure associated with a shock wave. The pressure taps 58 are arranged along the inlet to allow for movement of the desired position of the shock wave due to changes of the geometry of the inlet 50 caused by the positioning of the inlet spike 54.

Inlet Control System Components and Operation

The inlet control system 70 includes an inlet control system computer (ICSC) 72 and a duct pressure ratio transducer (DPRT) 74, as shown in FIG. 2. The ICSC 72 is in communication with the DPRT 74, which in turn is in communication with the pressure taps 58 of the inlet 50.

The ICSC 72 controls positioning of the inlet spike 54 and the bypass baffle 60 so as to deliver the proper airflow to the engine 64. Specifically, the ICSC 72 controls the fore/aft position of the inlet spike 54 and the open/close position of the bypass baffle 60. The ICSC 72 possesses a database having a set of inlet control laws which provide desired pressure ratios for positioning the shock wave for a given flight condition, to achieve proper engine performance. The flight condition is determined from inputs from the aircraft instrumentation (e.g. pressure altitude, Mach number, pitch, roll, V, T, engine performance requirements and the like). The shock wave is positioned by the ICSC 72 calculating from control laws a schedule of pressure ratios. This schedule of pressure ratios is issued to the DPRT 74, which compares the schedule to the pressure ratios measured by the pressure taps 58. From this comparison the DPRT 74 may issue back to the ICSC an error signal. The error signal is used by the ICSC 72 to command changes in the position of the bypass baffle 60 so as to cause the shock wave to move to the desired position in the inlet 50.

The DPRT 74 operates to combine each pressure reading taken by the pressure taps 58 with the static and dynamic pressures measured at a location outside the inlet. The DPRT 74 then converts these combinations into a set of pressure ratios suitable for deducing the shock wave location through the accompanying pressure rise. Next, the DPRT 74 compares the measured pressure ratios with the scheduled pressure ratios it receives from the ICSC 72. In the event that the measured pressure ratios differ from the scheduled (desired) pressure ratios, then the DPRT 74 will issue an error signal to the ICSC 72. As noted, the ICSC 72 will use the error signal to command appropriate changes to the positions of the inlet spike 54 and the bypass baffle 60.

The exact control laws stored in and used by the ICSC 72 will depend on the specifics aspects of the use to which they are employed. That is, the ICSC 72 will contain a set of control laws corresponding to the specific aircraft, inlet, engine and other relevant components. Each set of control laws will further vary by the current flight conditions, thus, the pressure ratio schedules produced by the control laws will change as the flight conditions change. The control laws can be derived either through theoretical or empirical methods. The theoretical approach involves a detailed analysis and modeling of the aircraft, inlet, engine and flight conditions. This analysis and modeling is carried out by those skilled in the art of inlet and engine design at supersonic flows. Although precise results can be obtained through such analysis and modeling, the control laws can also be developed from empirical data obtained from flight tests involving a series and/or range of flight conditions. In this manner, a set of inlet control laws for each flight condition, for providing optimum shock wave positioning, can be determined.

The inlet control laws used by the ICSC 72 in the present invention differ from those used in presently existing inlet control systems, as they allow for the input of the ΔT value. The ΔT value is provided to the ICSC 72 by the microprocessor 42, as explained in detail above. The ICSC 72 uses the control laws, with the ΔT value as an input, to provide a set of scheduled pressure ratios which will act to anticipate the change in pressure which will result from the arrival in the inlet 50 of the change in temperature. This anticipation will result in an error signal being sent to the ICSC 72 to cause the bypass baffle 60 to be adjusted to accommodate the temperature change.

For example, if the ICSC 72 receives from the data unit 40 an anticipated change in temperature (e.g. ΔT*0), then using the inlet control laws for the present aircraft, inlet, engine and flight conditions, the ICSC 72 will derive a new schedule of pressure ratios. This schedule will be transmitted to the DPRT 74, which will compare the schedule to the pressure distribution measured by the pressure tabs 58 Assuming no other flight condition has changed from the last comparison, the new schedule of pressure ratios will differ from the measured set. This difference will cause the DPRT 741 to issue an error signal to the ICSC 72, which in turn will issue a command to adjust the baffle 60 to correct for the error.

In contrast, if there is no change in temperature detected (ΔT=0), then (assuming all other flight conditions remain constant) the ICSC 72 will continue to issue the same schedule of pressure ratios to the DPRT 74. Since the measured pressure ratios will continue to match the schedule of pressure ratios, the DPRT 74 will not issue an error signal back to ICSC 72. Thus, there will be no change to the setting of the baffle 60.

As with the prior existing control laws which do not account for a inclusion of a ΔT value, the control laws which utilize ΔT as an input can be derived either through theoretical or empirical methods. Again, the theoretical approach involves detailed analysis and modeling by experts in the art to obtain a set of control laws for the range of flight conditions. However, flight tests involving a series and/or range of flight conditions, where the effect of a change in temperature is measured, can be used to achieve a set of inlet control laws which utilize the ΔT value for deriving a schedule of pressure ratios for optimum shock wave positioning.

In the preferred embodiment, the time which it takes for the inlet control system 70 to react to a change in temperature is very nearly equal to the time for the temperature change to reach the inlet throat 56. As such, the pressure change behind the shock wave, caused by repositioning the baffle 60, coincides with the pressure change resulting ahead of the shock wave due to the change in the temperature of the airflow. Thus, in the preferred embodiment, the shock wave remains generally in the same position it possessed in the inlet throat 56 prior to the changes in temperature and baffle position, avoiding the onset of an unstart condition. The timing involved in the reaction of the inlet control system can be determined through theoretical or empirical methods. In alternative embodiments, the reaction of the control system can lead or lag the arrival of the temperature change. This is acceptable so long as the resulting movement, from either anticipating the temperature change, or reacting to it, would not be so great as to cause an inlet unstart.

Method of Preventing Unstart Condition in the Inlet

Figure 3:
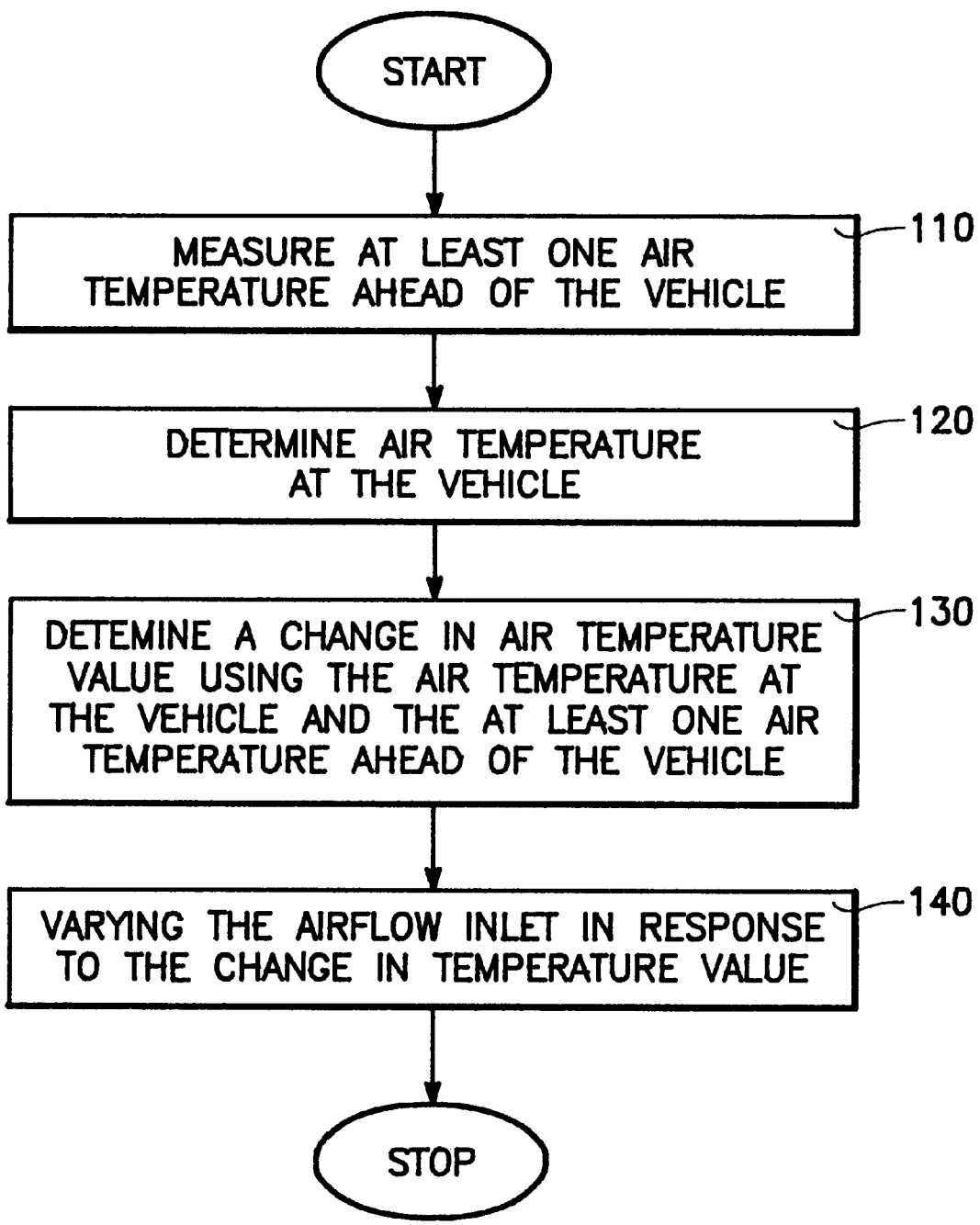
FIG. 3 is a flow chart showing the steps of a method for preventing an inlet unstart condition in an engine inlet.

As shown in FIG. 3, one embodiment of the method for preventing an unstart condition in a supersonic vehicle having a variable airflow inlet with a shock wave positioned within, utilizes the preferred apparatus described herein and includes: measuring at least one air temperature ahead of the vehicle 110, determining air temperature at the vehicle 120, determining a change in air temperature value using the air temperature at the vehicle and the at least one air temperature ahead of the vehicle 130, and varying the airflow inlet in response to the change in temperature value 140.

The step of measuring at least one air temperature ahead of the vehicle 110, includes using the sensor unit 10 with one or more frequencies to find the brightness temperatures at one or more applicable ranges horizontally ahead of the vehicle. The frequencies used can be 58.8 GHz and 57.2 GHz which, assuming a flight altitude of 19 km, correspond to respective ranges of 1.4 km and 2.4 km. A statistical regression analysis is used to provide a temperature measurement corresponding to Δt (approximately one second) of flight time ahead of the aircraft. This temperature measurement is provided by the microprocessor 42.

The step of determining air temperature at the vehicle 120, is performed by analyzing previous measurements of air temperature ahead of the aircraft, taken by previous remote sensor temperature measurements, and allowing for the time required to fly to the location of the prior measurements. The microprocessor 42 performs the analysis of previous air temperature measurements.

The step of determining a change in air temperature value using the air temperature at the vehicle and the air temperature measured ahead of the vehicle 130, is also performed by the microprocessor 42. The microprocessor 42 takes the difference between the temperature measurement corresponding to Δt flight time ahead of the aircraft and the air temperature at the vehicle to produce the change in temperature value. The microprocessor 42 sends the change in temperature value to the ICSC 72 of the inlet control system 70.

Figure 4:
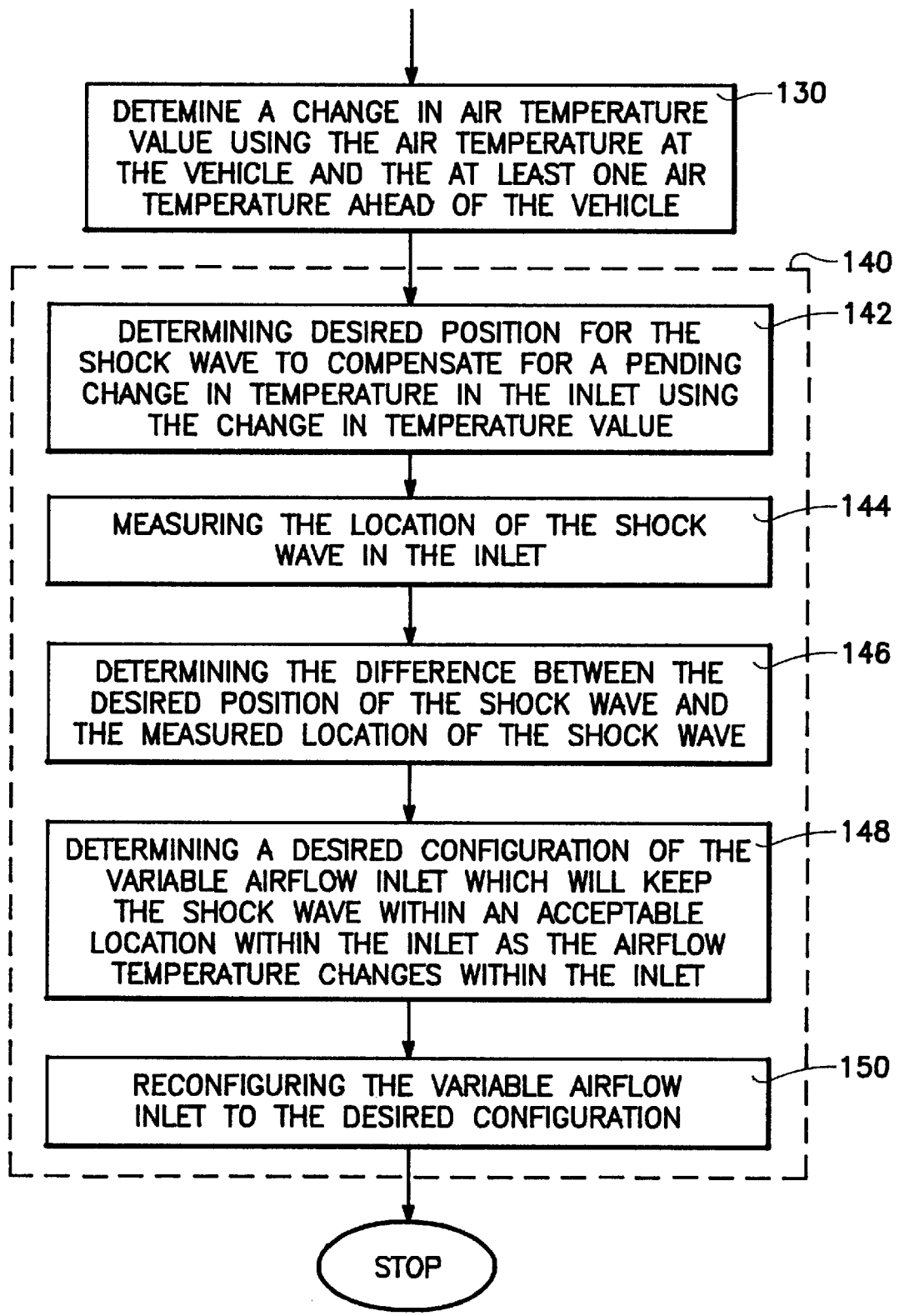
FIG. 4 is a flow chart showing the steps of a method of preventing an inlet unstart condition in an engine inlet.

The step of varying the airflow inlet in response to the change in temperature value 140 can be more specifically defined as using the change in temperature value to reposition the airflow inlet to cause the shock wave to remain within an acceptable location in the inlet as the airflow temperature changes, to prevent an unstart. Preferably, the airflow inlet is varied so that the shock wave is maintained in substantially the same position within the inlet as the airflow temperature changes within the inlet. The step of varying the airflow inlet in response to the change in temperature value 140 includes a set of sub-steps which are shown FIG. 4. These sub-steps include: determining a desired position for the shock wave to compensate for a pending change in temperature in the inlet using the change in temperature value 142, measuring the location of the shock wave in the inlet 144, determining the difference between the desired position of the shock wave and the measured location of the shock wave 146, determining a desired configuration of the variable airflow inlet which will keep the shock wave within an acceptable location within the inlet as the airflow temperature changes within the inlet

148, and reconfiguring the variable airflow inlet to the desired configuration 150.

These sub-steps are performed by the inlet control system 70. The ICSC 72 calculates a desired position for the shock wave to compensate for a pending change in temperature in the inlet 50 using the change in temperature value with an appropriate set of inlet control laws. The DRPT 74 of control system 70 measures the location of the shock wave in the inlet 50 by using the pressure measurements provided by the pressure taps 58. The DRPT 74 compares the desired shock wave position to the measured position and determines the difference between the two. The DRPT 74 uses this difference to calculate an error signal which is sent to the ICSC 72. The ICSC 72 uses the error signal to determine a desired position of the bypass baffle 60 which will cause the shock wave to maintain substantially the same position within the inlet 50, as the airflow temperature changes in the inlet 50. The repositioning of the bypass baffle 60 is performed by the ICSC 72 sending a command signal to the baffle motor 62.

Figure 5:
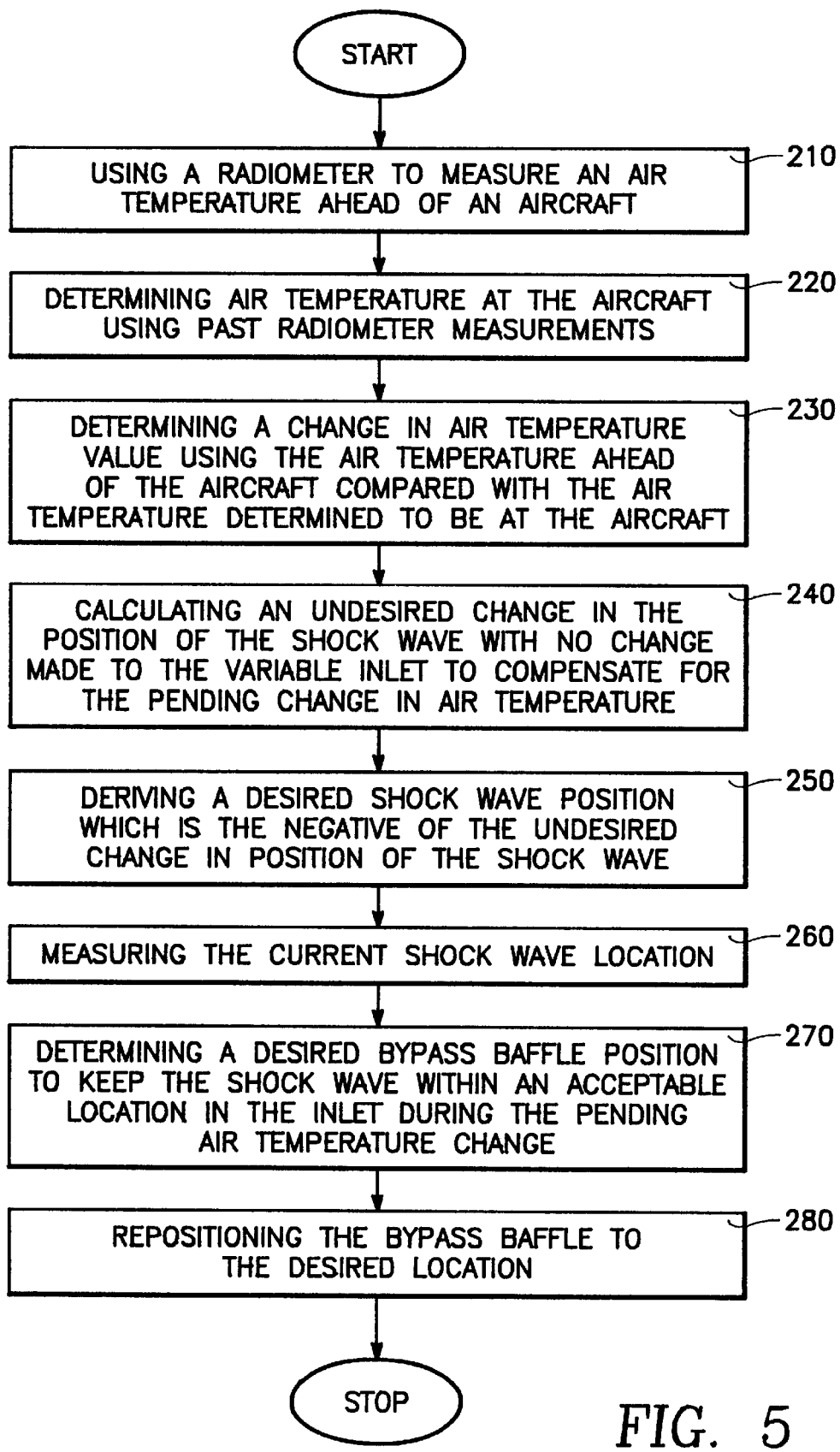
FIG. 5 is a flow chart showing the steps of a method of preventing an inlet unstart condition in an engine inlet.

As shown in FIG. 5, in one embodiment the method includes: using a radiometer to measure an air temperature ahead of an aircraft 210, determining air temperature at the aircraft using past radiometer measurements 220, determining a change in air temperature value using the air temperature ahead of the aircraft compared with the air temperature determined to be at the aircraft 230, calculating an undesired change in the position of the shock wave with no change made to the variable inlet to compensate for the pending change in air temperature 240, deriving a desired shock wave position which is the negative of the undesired change in position of the shock wave 250, measuring the current shock wave location 260, determining a desired bypass baffle position to keep the shock wave within an acceptable location in the inlet during the pending air temperature change 270, and repositioning the bypass baffle to the desired location 280. The step of determining air temperature at the aircraft using past radiometer measurements 220, includes maintaining a list of measurements of brightness temperature and their associated applicable range locations along the flight path, identifying from this list those measurements corresponding to the expected location of the aircraft at the present time and at Δt in the future.

In one embodiment of the method of the invention the method is employed in an air vehicle having a variable bypass baffle. The method includes estimating the likely change in air temperature (ΔT) that will occur during the next time interval (Δt), during which time a commanded bypass baffle position change will take place. The parameter ΔT is determined by comparing brightness temperature measurements that have applicable range locations at the present aircraft location and the expected location of the aircraft Δt in the future. In one example, with Δt approximately 1.0 second, and an aircraft speed of Mach 2.4 (700 meters a second), the radiometer is set to measure air temperature 700 meters ahead of the aircraft. The trend of inlet air temperature (ΔT/Δt) is determined and is communicated to the inlet control system, which calculates a bypass baffle position change required to compensate for the shock wave movement which would occur in the absence of a bypass baffle setting change. The inlet control system commands the bypass baffle to begin a position change, so that the baffle reaches it new position after time interval Δt and just as the air with the new temperature enters the engine inlet.

While the invention has been described in detail by specific reference to preferred embodiments, it is understood that variations and modifications thereof may be made without departing from the true spirit and scope of the invention.

What is claimed is:

1. In a flight vehicle having a variable inlet/engine assembly, an apparatus comprising:

A. a remote sensor for measuring air temperature ahead of the vehicle, the sensor mounted to the vehicle;

B. a control system connected to the remote sensor for varying the inlet/engine assembly in response to the air temperature measured by the remote sensor.

2. The apparatus of claim 1, wherein the remote sensor measures the air temperature sufficiently ahead of the vehicle such that the control system can vary the inlet/engine assembly substantially coincident with an arrival at the inlet/engine assembly of the air temperature measured by the remote sensor.

3. The apparatus of claim 2, wherein the variable inlet/engine assembly comprises a variable airflow inlet and an engine, and wherein the control system varies the inlet in response to the air temperature measured by the remote sensor.

4. The apparatus of claim 3, wherein the control system varies the inlet in response to a change in the air temperature measured by the remote sensor.

5. In an air vehicle capable of supersonic flight, the vehicle having a variable airflow inlet, the inlet capable of retaining a shock wave within, an apparatus comprising:

A. a remote sensor for measuring air temperature ahead of the vehicle, the sensor mounted to the vehicle;

B. an inlet control system connected to the remote sensor for varying the inlet in response to changes in the air temperature measured by the remote sensor to control positioning of the shock wave within the inlet.

6. The apparatus of claim 5, wherein the remote sensor measures the air temperature sufficiently ahead of the vehicle such that the inlet control system can vary the inlet substantially coincident with an arrival at the inlet of the air temperature measured by the remote sensor.

7. The apparatus of claim 6, wherein the remote sensor is a radiometer.

8. The apparatus of claim 7, wherein the radiometer is a passive microwave radiometer.

9. The apparatus of claim 6, wherein the variable airflow inlet comprises an adjustable bypass baffle for controlling airflow through the inlet.

10. The apparatus of claim 9, wherein the inlet has an exterior wall, wherein the bypass baffle comprises:

A. an adjustable bypass door mounted to the exterior wall for diverting an amount of air out of the inlet; and B. a motor connected to the bypass door for adjusting the position of the bypass door such that the amount of air diverted out of the inlet can be varied, the motor connected to the engine inlet control system to allow the inlet control system to control the motor.

11. The apparatus of claim 6, wherein the inlet is a converging-diverging inlet, comprising:

A. a converging portion;

B. a diverging portion; and

C. a throat portion positioned between the converging and the diverging portions.

12. The apparatus of claim 11, wherein the control system maintains the shock wave substantially about the throat portion of the inlet.

13. In a supersonic capable vehicle having an engine inlet, an apparatus for preventing an unstart condition in the inlet, the inlet having a shock wave positioned within, an adjustable bypass baffle for varying the airflow within the inlet, and a plurality of pressure transmitters positioned along the inlet for measuring air pressure within the inlet, the apparatus comprising:

A. a microwave radiometer for measuring temperature, the radiometer mounted to the vehicle and orientated to measure air temperature at at least one position ahead of the vehicle;

B. A vehicle temperature measurer for measuring air temperature at the vehicle;

C. a temperature comparer for determining a change in temperature value equal to the difference between at least one air temperature measured ahead of the vehicle by the radiometer and the air temperature at the vehicle, the temperature comparer connected to the radiometer to receive the measurement of the air temperature at at least one position ahead of the vehicle; the temperature comparer connected to the vehicle temperature measurer to receive the measurement of the air temperature at the vehicle;

D. an inlet control system in communication with the temperature comparer, the pressure transmitters and the bypass baffle, for using pressure measurements from the pressure transmitters to determine a location of the shock wave within the inlet, for varying the bypass baffle to control the location of the shock wave within the inlet, and for using the change in temperature value to vary the bypass baffle to maintain the position of the shock wave during the arrival of the change in air temperature at the inlet.

14. The apparatus of claim 13, wherein the inlet has a throat portion, and wherein the inlet control system operates to maintain the shock wave at a predetermined location within the throat portion.

15. The apparatus of claim 14, wherein the inlet is a converging-diverging inlet comprising:

A. a converging portion positioned forward of the throat section; and

B. a diverging portion positioned aft of the throat section.

16. The apparatus in claim 13, wherein the microwave radiometer is a double sideband radiometer which measures a first air temperature at a first location ahead of the aircraft and a second air temperature at a second location ahead of the vehicle, wherein the radiometer transmits the temperature measurements to the temperature comparer, wherein the temperature comparer calculates the change in temperature value based upon values including the first temperature, the second temperature and the air temperature at the vehicle.

17. The apparatus of claim 16, wherein the temperature comparer calculate the change in temperature value by a Backus-Gilbert retrieval procedure.

18. The apparatus of claim 17, wherein the temperature comparer has a retrieval coefficient database to calculate the change in temperature value by a statistical retrieval procedure.

19. In a vehicle having a variable inlet/engine assembly, a method comprising:

measuring at least one air temperature ahead of the vehicle; and varying the inlet/engine assembly in response to the at least one air temperature measurement.

20. The method of claim 19, wherein varying the inlet/engine assembly in response to the at least one air temperature measurement comprises:

determining a change in temperature value using the at least one air temperature measurement; and varying the inlet/engine assembly in response to the change in temperature value.

21. The method of claim 20, wherein measuring at least one air temperature ahead of the vehicle is performed by a radiometer.

22. The method of claim 20, wherein measuring at least one air temperature ahead of the vehicle is performed by a passive microwave radiometer.

23. The method of claim 20, wherein the variable inlet/engine assembly comprises a variable airflow inlet and an engine, and wherein the step of varying the inlet/engine assembly varies the variable airflow inlet in response to the change in temperature value.

24. The method of claim 20, wherein the at least one air temperature measurement is taken at a location sufficiently ahead of the vehicle such that the inlet/engine assembly is varied substantially coincident with an arrival at the inlet/engine assembly of the measured air temperature.

25. The method of claim 19, wherein varying the inlet/engine assembly in response to the at least one air temperature measurement comprises:

determining an air temperature at the vehicle;

determining a change in temperature value using the at least one air temperature measurement and the air temperature at the vehicle; and varying the inlet/engine assembly in response to the change in temperature value.

26. In a supersonic capable vehicle having a variable airflow engine inlet with a shock wave at a position within the inlet, a method for preventing an unstart condition comprising:

measuring an air temperature at at least one applicable range ahead of the vehicle;

determining an air temperature at the vehicle;

determining a change in temperature value using the air temperature at the vehicle and the at least one air temperature measurement ahead of the vehicle; and using the change in temperature value to reposition the variable airflow inlet to cause the shock wave to remain within an acceptable location in the inlet as the airflow temperature changes within the inlet.

27. The method of claim 26, wherein using the change in temperature value to reposition the variable airflow inlet causes the shock wave to maintain substantially the same position within the inlet as the airflow temperature changes within the inlet.

28. The method of claim 26, wherein determining an air temperature at the vehicle comprises:

retaining prior air temperature measurements and their applicable ranges, and determining an air temperature measurement corresponding to the position of the vehicle from the retained prior air temperature measurements.

29. The method of claim 28, wherein determining a change in temperature value comprises:

determining an air temperature measurement corresponding to an expected position of the vehicle at a predetermined period of time in the future from the retained prior air temperature measurements, and calculating a change in temperature value using the temperature measurement corresponding to the position of the vehicle and the air temperature measurement corresponding to an expected position of the vehicle at a predetermined period of time in the future.

30. The method of claim 29, wherein using the change in temperature value to reposition the variable airflow inlet comprises:

determining a desired position for the shock wave to compensate for a pending change in temperature in the inlet using the change in temperature value, measuring the location of the shock wave in the inlet, determining a difference between the desired position of the shock wave and the measured location of the shock wave, determining a desired configuration of the variable airflow inlet which will keep the shock wave within an acceptable location within the inlet as the airflow temperature changes within the inlet, and reconfiguring the variable airflow inlet to the desired configuration of the variable airflow inlet which will keep the shock wave within an acceptable location within the inlet as the airflow temperature changes within the inlet.

31. The method of claim 26, wherein using the change in temperature value to reposition the variable airflow inlet comprises:

calculating a desired position for the shock wave to compensate for a pending change in temperature in the inlet using the change in temperature value;

measuring the location of the shock wave in the inlet;

determining the difference between the desired position of the shock wave and the measured location of the shock wave;

determining a desired configuration of the variable airflow engine inlet which will cause the shock wave to remain within an acceptable location in the inlet as the airflow temperature changes within the inlet; and reconfiguring the variable airflow engine inlet to the desired configuration.

32. The method of claim 26, wherein the step of measuring at least one air temperature ahead of the vehicle is performed by a microwave radiometer.

33. The method of claim 32, wherein measuring at least one air temperature ahead of the vehicle comprises using the microwave radiometer to measure a first air temperature at a first location ahead of the aircraft and a second air temperature at a second location ahead of the vehicle.

34. The method of claim 33, wherein determining a change in temperature value using the air temperature at the vehicle and the at least one air temperature measurement ahead of the vehicle comprises:

employing a Backus-Gilbert retrieval procedure to determine a third air temperature value from the first and second air temperatures;

determining a change in temperature value equal to a temperature difference between the air temperature at the vehicle and the third air temperature.

35. The method of claim 33, wherein the vehicle further comprises a retrieval coefficient database, and wherein determining a change in temperature value using the air temperature at the vehicle and the at least one air temperature measurement ahead of the vehicle comprises:

employing a statical retrieval procedure to determine a third air temperature value from the first air temperature, the second air temperature and the retrieval coefficient database;

determining a change in temperature value equal to a temperature difference between the air temperature at the vehicle and the third air temperature.

* * * * *